United States Patent [19]

Lidholt et al.

[11] 4,389,091
[45] Jun. 21, 1983

[54] METHOD AND DEVICE FOR CONNECTING OPTICAL FIBERS

[76] Inventors: Rune Lidholt, Skogsmyrsvägen 4A, 752 45 Upsala; Ingvar Nodfelt, Hornabogatan 2, 330 30 Gnosjö, both of Sweden

[21] Appl. No.: 120,349

[22] Filed: Feb. 11, 1980

[30] Foreign Application Priority Data

Feb. 16, 1979 [SE] Sweden .................... 7901398

[51] Int. Cl.³ .................................. G02B 7/26
[52] U.S. Cl. .................. 350/96.20; 350/96.21; 350/320
[58] Field of Search ............ 350/96.20, 96.21, 96.22, 350/320

[56] References Cited

U.S. PATENT DOCUMENTS

| | | | |
|---|---|---|---|
| 4,087,155 | 5/1978 | Deacon | 350/96.21 |
| 4,107,242 | 8/1978 | Runge | 350/96.21 X |
| 4,158,476 | 6/1979 | McCartney | 350/96.21 |
| 4,181,402 | 1/1980 | Borsuk et al. | 350/96.21 |
| 4,208,093 | 6/1980 | Borsuk | 350/96.20 |

FOREIGN PATENT DOCUMENTS

| | | | |
|---|---|---|---|
| 2808002 | 8/1978 | Fed. Rep. of Germany | 350/96.21 |
| 2741367 | 12/1978 | Fed. Rep. of Germany | 350/96.21 |

*Primary Examiner*—John D. Lee
*Attorney, Agent, or Firm*—Holman & Stern

[57] ABSTRACT

A method and device for use in connecting the ends of an optical fibre with another optical fibre or other optical component. The method comprises positioning and fixing a fibre end in a sleeve member in relation to a reference surface and thereafter positioning the reference surface in a coupling device which accurately locates the fibre end in the correct position for the connection. The device comprises sleeve and coupling members having integral clamping and positioning elements to accurately position the fibre end for connection.

10 Claims, 5 Drawing Figures

1

METHOD AND DEVICE FOR CONNECTING OPTICAL FIBERS

BACKGROUND OF THE INVENTION

The present invention relates to a method and a device for connecting an optical fibre with another optical component, for example another optical fibre.

Recently the use of optical transmission links for transferring information has substantially increased. Such optical transmission links consist of a transmitter, which converts an electric signal into an optical signal, a transmission line in the form of a fibre cable and a receiver which resets the optical signal into the original electrical signal.

A great advantage of the optical transmission links in relation to conventional transmission links resides in the small diameter and low weight of a fibre cable in relation to the diameter and the weight of a conventional electrical cable.

However, these properties also produce disadvantages, as the small diameter of the fibres brings about difficulties with regard to the necessary jointing of the fibres in an exact way. The joints provide losses which restrict the maximum transmission distance, and these losses are drastically increased if the fibres are radially or axially displaced or make an angle in relation to each other in the joints. For this reason there have recently been developed a large number of methods and devices for connecting optical components and especially optical fibres with each other so that the fibre ends are positioned exactly correct in relation to each other.

However, the methods and devices previously known have certain drawbacks by either being extremely complicated and expensive or by requiring a great skill. Any simple, cheap and easily performed methods and devices which comply with the required exactness of the position of the optical components in the joints are not previously known.

BRIEF SUMMARY OF THE INVENTION

Therefore, it is an object of the present invention to provide a method and a device for connecting the end portion of an optical fibre with another optical component, for example another optical fibre, wherein the above drawbacks are obviated.

In accordance with the present invention there has been provided a method of connecting an end portion of an optical fibre with another optical component, for example another optical fibre, wherein the end portion of the optical fibre is positioned and fixed in a sleeve element by axially displacing at least three centering elements, which are positioned between the surface of the end portion of the optical fibre and a surface portion, which encloses the end portion of the optical fibre and tapers in the axial direction of the sleeve element, said surface portion preferably being conical in relation to the sleeve element to engagement with the surface of the fibre end portion as well as said tapering surface portion and the sleeve element with the fibre end portion fixed therein and the other optical component are positioned in a coupling device with the optical fibre and the other optical component in optical connection with each other, the method being characterized in that the end portion of the optical fibre by said positioning and fixing in the sleeve element is provided in an exactly predetermined position in relation to an outer reference surface of the sleeve element and that tne end surface of the fibre end portion fixed in the sleeve portion is positioned in a correct connection position in relation to the other optical component by positioning the reference surface of the sleeve element in engagement with guiding surfaces in the coupling device.

Irrespective of the diameter of the fibre there is in this way provided a simple and reliable positioning and fixing of the fibre in the sleeve element, in turn providing for a connection of the end surface of the optical element with the other optical component by means of the engagement between the reference surface of the sleeve element and the guiding surfaces of the coupling device. Thereby, it is preferred that the end portion of the optical fibre is fixed in the sleeve element in the correct position by means of gluing.

It is also preferred that the end portion of the optical fibre extend out from the sleeve element during the positioning and fixing of the end portion and is cutoff to produce the connection end surface after said fixing.

According to the invention there is also provided a device for connecting the end portion of an optical fibre with another optical component, comprising a sleeve element for receiving and fixing the end portion of the optical fibre and a coupling device for receiving the sleeve element with the fibre end portion fixed therein and the other optical component with the optical fibre and the other optical component in optical connection with each other, whereby the sleeve element is provided with a surface portion which tapers in the axial direction of the sleeve element and preferably is of conical shape, and further comprises at least three centering elements contacting said surface portion, the centering elements constituting between themselves a central passage for the fibre end portion, and means for axially displacing the tapering surface portion in relation to the centering elements in order to displace the centering elements in to engagement with said surface portion of the sleeve element as well as the surface of the fibre end portion, the device being characterized by the fact that the sleeve element has an outer reference surface which has an exactly predetermined position in relation to said tapering surface portion of the sleeve element, so that the position of the reference surface is exactly predetermined in relation to the fibre end portion after the fibre end portion has been fixed by means of the centering elements, and that the coupling device comprises guiding surfaces which are adapted to be engaged by the reference surface when the sleeve element is received in the coupling device and which have a predetermined position in the coupling device so that said engagement between the guiding surfaces and the reference surface provides for a guiding of the end surface of the fibre end portion to a correct connection position in relation to the other optical component.

It is preferred that the centering elements of the device are constituted by balls and that the sleeve element consists of two concentric portions which are axially displacable in relation to each other, said tapering surface portion being provided in the outer portion of the sleeve element and the inner portion of the sleeve element engaging the balls by means of an end portion in order to provide the axial displacement of the centering elements in relation to the tapering surface portion when said portions of the sleeve element are axially displaced in relation to each other.

BRIEF DESCRIPTION OF THE DRAWINGS

The invention will now be described in more detail with reference to the accompanying drawings wherein.

DETAILED DESCRIPTION

Figure 1:
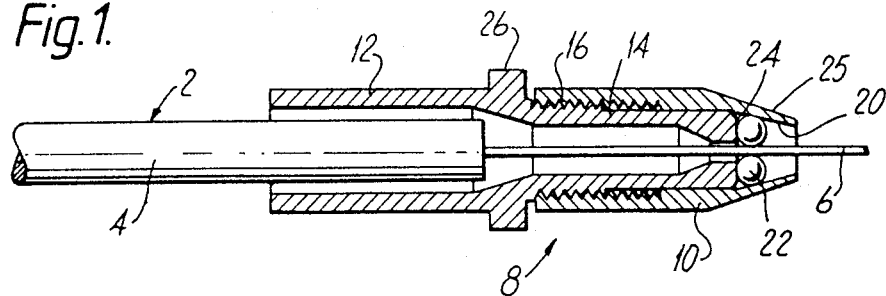
FIG. 1 is an axial section of a sleeve element being a part of a device according to the invention.
Figure 2:
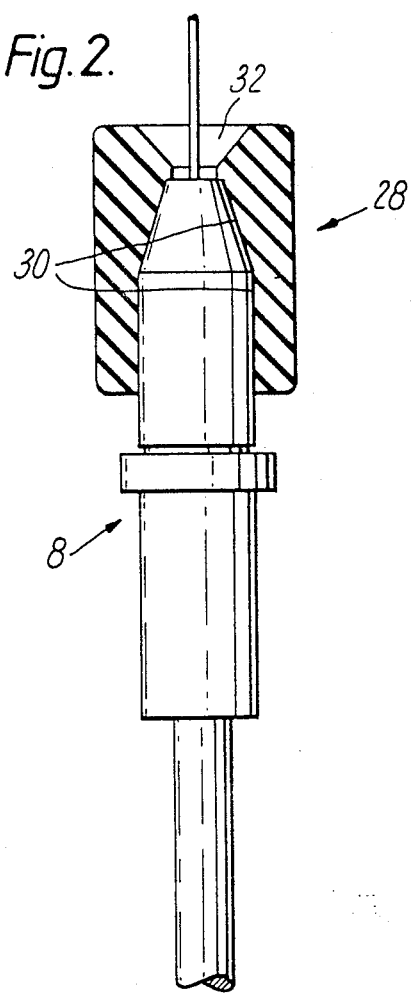
FIG. 2 is an axial section of a protective cap to be used in performing the method according to the invention.

In FIG. 1 there is shown an end portion of a fibre cable 2 comprising a sheath 4 and a fibre which is uncovered at its end portion 6. The fibre cable 2 extends through a sleeve element 8, which consists of one portion 10 and one portion 12, the portion 12 having a part 14 extending concentrically with and into the portion 10. The portions 10 and 12 are connected with each other by means of threads 16, which provides an axial displacement of the portions 10 and 12 when the portions are rotated in relation to each other. In order to provide for a centering of the fibre end portion 6 in the sleeve element the portion 10 thereof is at its end portion provided with a conical inner surface portion 20 and three centering members in the form of balls 22 engaging the surface portion 20. The end surface 24 of the part 14 projecting into the portion 10 engages the balls 22. Thus, it is possible to determine the size of the central opening between the balls 22 by displacing the part 14 in relation to the portion 10 by rotating the part 14 in relation to the portion 10, as the positions of the balls 22 in relation to each other will be determined by the positions where the balls engage the conical surface portion 20.

When the fibre end portion is introduced into the sleeve element, the part 14 should have such a position in relation to the portion 10 that there is provided a central opening between the balls 22, through which the fibre end portion can be easily moved. After the introduction of the fibre end portion the balls 22 are displaced into engagement with the surface of the fibre end portion 6 as well as the conical surface portion 20 so that the fibre end portion is adjusted to a central position in the sleeve element 8. At its end portion the sleeve element has a conical outer surface 25, which is concentric with the conical surface portion 20 and has an object which is described more in detail hereinafter.

The sleeve element can comprise a clamping ring or the like (not shown) for unloading the fibre end portion with regard to axial displacement by clamping the sheath 4 of the fibre cable 2.

The portion 12 of the sleeve element 8 is formed with a peripheral flange 26 which has the object of facilitating the fixing of the sleeve element 8 in a way which is described more in detail hereinafter.

After the above described positioning of the fibre end portion in the sleeve element 8 there is in a preferred embodiment of the method according to the invention provided a fixing of the fibre end portion 6 in relation to the sleeve element 8 by means of gluing. However, the fixing can be provided also by means of clamping. When the fixing is provided by means of gluing there is used a cup 28 consisting of for example silicone rubber. The cup 28 is adapted around the end portion of the portion 10 of the sleeve element, whereby said end portion is received in the space 30 of the cup 28. A funnel-shaped portion 32 at the end of the cup is used for supplying a glue, for example an epoxy resin glue, to the end portion of the portion 10 of the sleeve element 8 positioned inside the funnel-shaped portion 32 in order to fix the position of the fibre end portion 6 in relation to the sleeve element 8. It is thereby preferred that the fibre end portion 6 is retained in an extended position during the fixing operation so that also the part of the fibre end portion 6 which is in the same plane as the end surface of the portion 10 of the sleeve element 8 will be positioned in the same central relationship to the sleeve element as in a plane through the balls 22.

After the glue has hardened and the fibre end portion 6 has thereby been fixed in relation to the sleeve element 8, the fibre end portion 6 is broken in the area of or somewhat outside a plane through the end surface of the portion 10, an indication of fracture having before that suitably been provided in a conventional way by means of a diamond.

Figure 3:
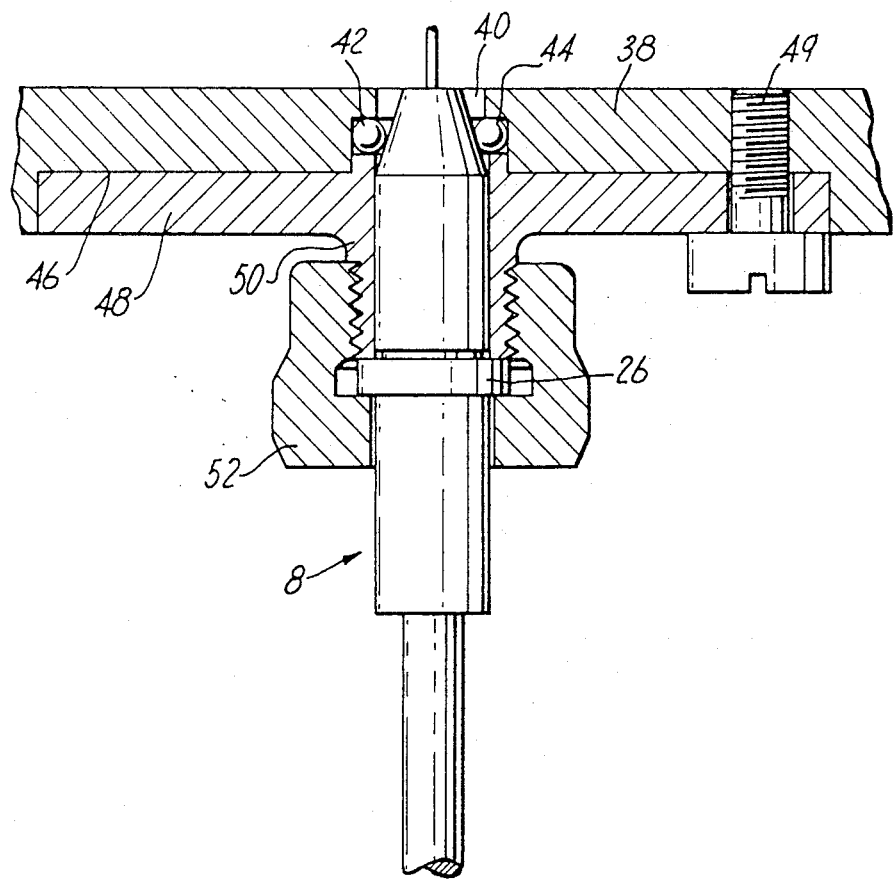
FIG. 3 is an axial section of a fixture to be used in performing the method according to the invention.

The sleeve element 8 is thereupon preferably disposed in a fixture as shown in FIG. 3, which makes it possible to provide an exact grinding and/or polishing of the end surface of the fibre end portion so that the axial position of said end surface in relation to the sleeve element 8 will be correct. The fixture according to FIG. 3 comprises a plate 38 having a through-opening 40. The opening 40 has a portion 42 with enlarged diameter, wherein balls 44 are positioned. Adjacent the opening 40 is a recess 46 in plate 38 in which a circular plate 48 is positioned and fixed by means of a bolt 49. The plate 48 is provided with a pipe stud 50 which extends in a direction from the plate 4 and has an outer thread. As schematically shown in FIG. 3 the conical outer surface 25 of the sleeve element 8 engages the balls 44 and the flange 26 is fixed by means of a nut 52, which engages the thread of the pipe stud 50 and contacts the flange 26. In this way there is provided an exact adjustment of the axial position of the sleeve element 8 with respect to the plate 38.

In the fixed position provided as described above it is possible to grind and/or polish the end surface of the fibre end portion to an axial position which is the same in different connection devices.

Figure 4:
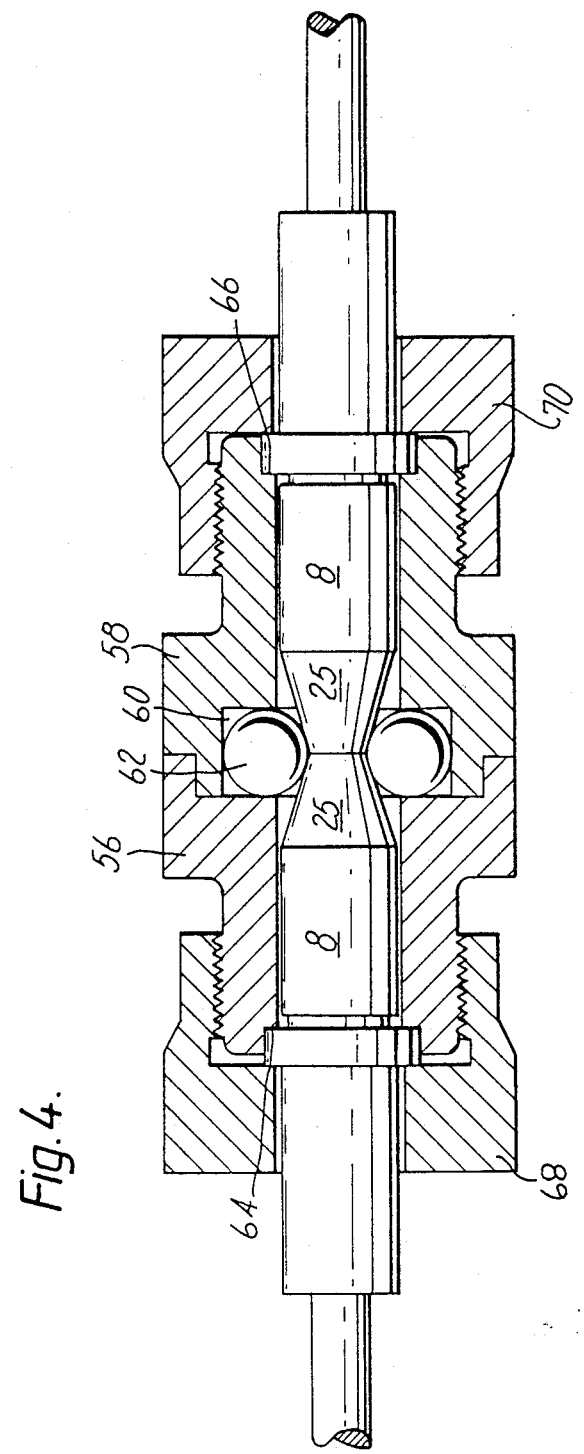
FIGS. 4 and 5 are axial cross-sections through two different embodiments of devices according to the invention.
Figure 5:
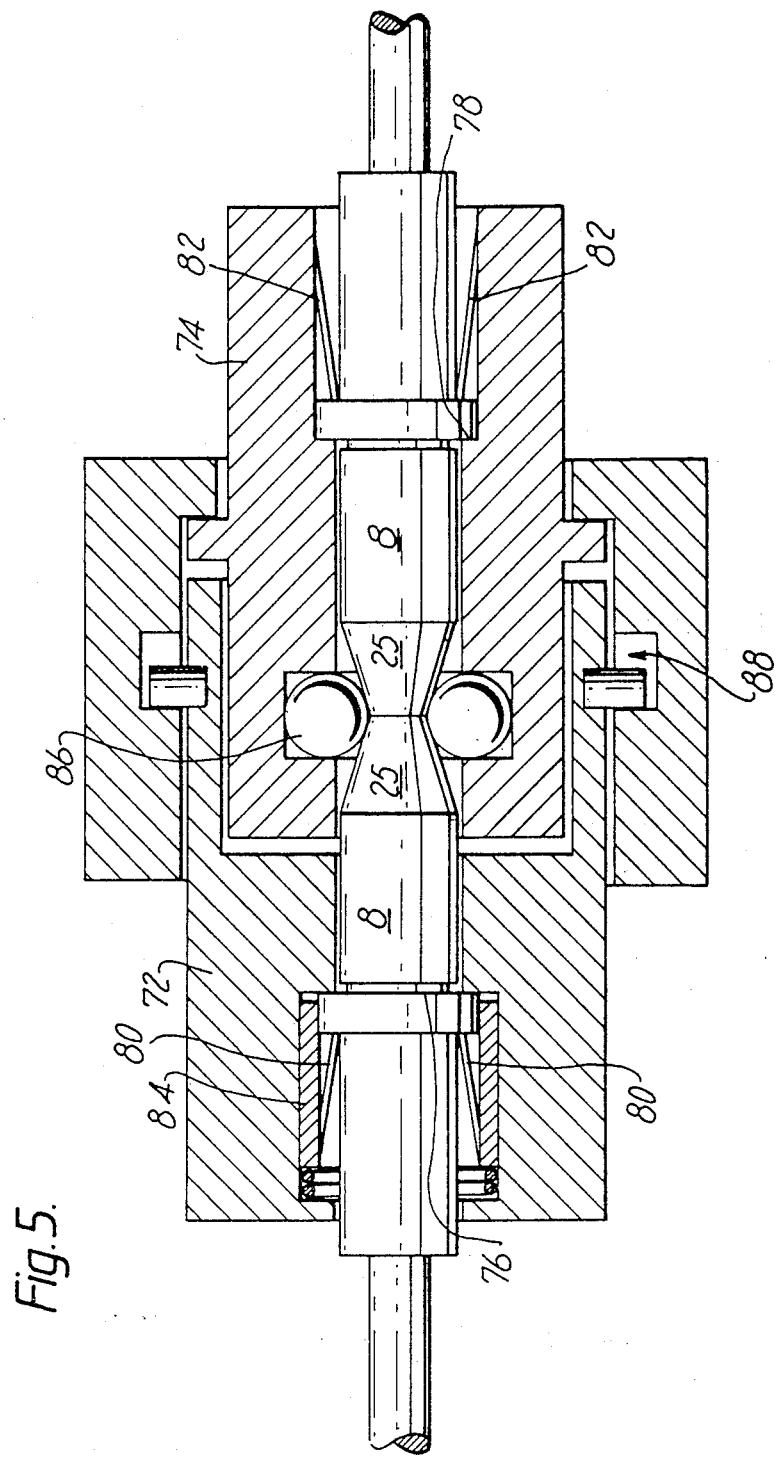

Since two fibre end portions which shall be connected with each other have been provided with sleeve elements as described above, it is possible to connect the fibre end portions with each other in a position, in which the end portions are in an exactly correct position in relation to each other for providing a loss in the joint which is as low as possible, said connection being provided by means of a device of the kind shown in FIGS. 4 or 5.

In FIG. 4 there is shown two sleeve elements 8 with fibre end portions fixed therein which are connected with each other. The connection or jointing device comprises a sleeve which consists of two parts 56 and 58 and has a central peripheral, inner groove 60 for receiving guiding balls 62. At its end portions the parts 56 and 58 of the sleeve are provided with recesses 64 and 66 which receive the flanges 26 of the sleeve elements 8. When the sleeve elements 8 are introduced into the sleeve 56, 58 the conical outer surfaces 25 will engage the balls 62 in order to guide the end portions of the sleeve elements 8 to exactly correct positions axially in relation to each other. Thereby, the position is reproduced, which the sleeve elements occupied in the fixture in which the surface 25 engages the balls 44. At their end portions the parts 56 and 58 of the sleeve are provided with outer threads to be engaged by nuts 68 and 70, respectively, which by engaging the flanges 26 of the sleeve elements 8 retain the sleeve elements 8 in correct positions in the sleeve parts 56, 58.

In FIG. 5 there is shown a modified embodiment of a device for connecting the sleeve elements 8 with each other. The connection device shown in FIG. 5 comprises two sleeves 72 and 74, each being connected with one of the sleeve elements 8. The sleeves 72 and 74 are provided with recesses 76 and 78, respectively, in which the flanges 26 of the sleeve elements are received. In order to retain the sleeve elements 8 in the sleeves 72 and 74 these are provided with locking springs 80 and 82, respectively, which snap in behind the flanges 26 after the sleeve elements 8 have been introduced into the sleeves 72 and 74 to engagement between the surfaces defining the recesses 76 and 78 and the flanges 26 of the sleeve elements. In order to provide for an increased engagement force of the locking springs it is possible to dispose the locking springs on a spring loaded portion 84, which presses the locking springs 80 to the right as shown in FIG. 5.

As described with reference to FIG. 4 there are also in the embodiment according to FIG. 5 used balls 86 for engaging the conical surfaces 25 of the sleeve elements 8 in order to guide the end portions of the sleeve elements to an exactly correct position in relation to each other. The connection of the sleeves 72 and 74 and thereby of the sleeve elements 8 and the fibre end portions thereof is according to FIG. 5 provided by means of a conventional bayonet socket 88.

The invention can be modified within the scope of the following claims.

We claim:

1. In a method for connecting an end portion of an optical fiber with another optical component, for example another optical fiber, wherein the end portion of the optical fiber is positioned and fixed in a sleeve element by axially displacing at least three centering elements which are positioned between the end portion of the optical fiber and an inner surface portion on said sleeve element which encloses the end portion of the optical fiber and tapers toward said end portion in the axial direction of the sleeve element, and the sleeve element with the fiber end portion fixed therein and the other optical component are positioned in a coupling device with the optical fiber and the other optical component in optical connection with each other, the improvement comprising providing an outer reference surface on said sleeve element having a uniform geometric relationship with said inner tapering surface, positioning and fixing the end portion of the optical fiber in the sleeve element in a predetermined position in relation to said outer reference surface, positioning the end surface of the fiber end portion fixed in the sleeve portion in a correct connection position in relation to the other optical component by providing a coupling device having a guiding surface which conforms to said outer reference surface, and positioning said reference surface of the sleeve element in engagement with said guiding surface on the coupling device.

2. A method as claimed in claim 1, wherein the end portion of the optical fiber is fixed in the sleeve element in said predetermined position in relation to the reference surface by gluing.

3. A method as claimed in claim 2, and further comprising positioning a protective cup around the end portion of the sleeve element just prior to gluing.

4. A method as claimed in any of the preceding claims, and further comprising after the fixing step grinding and polishing the end surface of said fiber end portion to the final axial position with respect to the sleeve at which it is to be connected with the other optical component.

5. A method as claimed in claim 4, and further comprising securing the sleeve element in a fixture during the grinding and polishing.

6. In a device for connecting the end portion of an optical fiber with another optical component, including a sleeve element for receiving and fixing the end portion of the optical fiber thereto, and a coupling device for receiving the sleeve element with the fiber end portion fixed therein and the other optical component with the optical fiber and the other optical component in position for optical connection with each other, wherein the sleeve element is provided with an inner surface portion which tapers toward said fiber end portion in the axial direction of the sleeve element and at least three centering elements contacting said surface portion, the centering elements constituting between themselves a central passage for clamping the fiber end portion, the improvement comprising means integral with said sleeve element for axially displacing the tapering surface portion in relation to the centering elements to displace the centering elements into clamping engagement with the surface of the fiber end portion, an outer reference surface on said sleeve element which has an exactly predetermined uniform geometric relation to said tapering surface portion of the sleeve element, so that the position of said reference surface is exactly predetermined in relation to the fiber end portion after the fiber end portion has been clamped by the centering elements, and a guiding surface on said coupling device conforming to said outer reference surface and adapted to be engaged by said reference surface when the sleeve element is received in the coupling device disposed in predetermined position in the coupling device so that said engagement between said guiding surface and said reference surface positions the end surface of the fiber end portion in correct position in relation to the other optical component.

7. A device as claimed in claim 6, wherein said inner tapering surface portion is conical, and said reference surface is a conical, outer surface portion on the sleeve element concentric with said inner conical surface portion.

8. A device as claimed in any one of claims 6 or 7, wherein said reference surface of the sleeve element is adapted to position the sleeve element in a fixture in which the sleeve element is disposed for grinding and polishing the fiber end portion for forming an end surface thereof which has an exactly predetermined position in relation to the reference surface.

9. A device as claimed in any one of claims 6 or 7 wherein said centering elements comprise balls.

10. A device as claimed in any one of claims 6 or 7 wherein said means integral with said sleeve element comprises concentric inner and outer parts which are axially displaceable in relation to each other, said inner tapering surface portion is on the outer part, and said inner part has an end which engages the centering elements to produce axial displacement of the centering elements in relation to the tapering surface portion in response to axial displacement of the inner and outer parts in relation to each other.

* * * * *